US006629503B2

United States Patent
Post

(10) Patent No.: US 6,629,503 B2
(45) Date of Patent: Oct. 7, 2003

(54) INDUCTRACK CONFIGURATION

(75) Inventor: Richard Freeman Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/896,579

(22) Filed: Jun. 29, 2001

(65) Prior Publication Data

US 2003/0005851 A1 Jan. 9, 2003

(51) Int. Cl.[7] .................................................. H01F 7/00
(52) U.S. Cl. ..................... 104/281; 104/283; 104/286
(58) Field of Search ........................... 104/281, 283, 104/282, 286, 290, 292, 294; 335/306, 216, 296, 302

(56) References Cited

U.S. PATENT DOCUMENTS

| 3,885,504 A | * | 5/1975 | Baermann | 104/283 |
| 3,937,148 A | * | 2/1976 | Simpson | 104/283 |
| 5,218,257 A | * | 6/1993 | Tozoni | 104/281 |
| 5,243,919 A | * | 9/1993 | Ninomiya | 104/281 |
| 5,319,275 A | * | 6/1994 | Tozoni | 104/281 |
| 5,343,811 A | * | 9/1994 | Schuster | 104/281 |
| 5,440,997 A | * | 8/1995 | Crowley | 104/283 |
| 5,652,472 A | | 7/1997 | Tozoni | |
| 5,717,261 A | * | 2/1998 | Tozoni | 104/282 |
| 5,722,326 A | * | 3/1998 | Post | 104/281 |
| 5,931,714 A | * | 8/1999 | Johnson | 104/281 |
| 6,101,952 A | * | 8/2000 | Thornton et al. | 104/130.02 |

FOREIGN PATENT DOCUMENTS

DE 250289 A1 11/1976
JP 4-88810 * 3/1992

* cited by examiner

Primary Examiner—Mark T. Le
(74) Attorney, Agent, or Firm—John P. Wooldridge; Alan H. Thompson

(57) ABSTRACT

A simple permanent-magnet-excited maglev geometry provides levitation forces and is stable against vertical displacements from equilibrium but is unstable against horizontal displacements. An Inductrack system is then used in conjunction with this system to effect stabilization against horizontal displacements and to provide centering forces to overcome centrifugal forces when the vehicle is traversing curved sections of a track or when any other transient horizontal force is present. In some proposed embodiments, the Inductrack track elements are also employed as the stator of a linear induction-motor drive and braking system.

15 Claims, 2 Drawing Sheets

INDUCTRACK CONFIGURATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to magnetic levitation systems for moving objects, and more specifically, to an improved magnetic levitation train system.

2. Description of Related Art

Halbach arrays, invented by Klaus Halbach in the 1980s for use in particle accelerators, represent a maximally efficient way to arrange permanent-magnet material when it is desired to produce a strong periodic magnetic field adjacent to the array. The beauty of the concept is that the effect of the cross-magnetized magnet bars in the array is to enhance the periodic magnetic field at the front face of the array, while canceling it back face of the array. Not only is the field enhanced, but analysis shows that in a long array the horizontal and vertical components are nearly purely sinusoidal in their spatial variation, with negligible higher spatial harmonics. If the Halbach array is then fabricated from high-field permanent-magnet material, such as NdFeB, peak fields near the front face of the array of order 1.0 Tesla are possible.

Particularly for lower-speed applications of magnetic levitation, such as for urban train systems, it is desirable to employ systems that are simple in construction and operation and that have low drag at urban speeds. Conventional maglev systems, that is, ones employing superconducting coils, or ones requiring servo-controlled electromagnets for levitation, appear to fall short on one or more of these counts.

Since it was first proposed the magnetic levitation of trains has been perceived to offer many potential advantages over conventional train technology. Besides the ability of maglev trains to operate a higher speeds than are deemed possible with wheel-and-rail trains, maglev trains should require less maintenance and be much smoother-riding and quieter than conventional rail systems. These perceived advantages have stimulated major development programs, particularly in Germany and Japan, to solve the technical and economic challenges of this new technology. These decades-long efforts have resulted in impressive demonstration systems, but as yet have not led to commercially operating rail systems in these countries. Factors that have slowed the deployment of high-speed maglev trains based on these technologies include technical complexity and high capital cost.

In an attempt to address these issues by taking advantage of new concepts and new materials, a different approach, called the Inductrack, was proposed. The first-proposed Inductrack disclosed in U.S. Pat. No. 5,722,326, titled "Magnetic Levitation System For Moving Objects", referred to herein as Inductrack I, employs special arrays of permanent magnets ("Halbach arrays"), on the moving train car to produce the levitating magnetic fields. These fields interact with a close-packed ladder-like array of shorted circuits in the "track" to levitate the train car. In this first form of the Inductrack, single arrays moving above the track produced the levitation. Whereas the Japanese maglev system employs superconducting coils and the German system requires servo-controlled electromagnets for levitation, the Inductrack is based on the use of high-field permanent magnet material, arranged in a special configuration called a Halbach array.

In the Inductrack maglev system Halbach arrays are used, located below the train car. When in motion the magnetic field of these arrays then induces currents in a special "track" made up of close-packed shorted circuits. Analysis has shown that the combination of the three elements, Halbach arrays, NdFeB magnet material, and close-packed circuits in the track result in the possibility of achieving levitation forces in excess of 40 metric tons per square meter of levitating magnets, corresponding to magnet weights of only a few percent of the levitated weight The use of Halbach arrays, high-field magnet material and close-packed circuits as employed in the Inductrack thus overcomes previous concerns, e.g., inadequate levitation forces, that led to questioning the practicality of using permanent magnets for maglev trains.

The theoretical analysis of the Inductrack leads to the evaluation of such quantities as the Lift-to-Drag ratio and the levitation power requirements as a function of train speed and of the magnet and track parameters. For the first-proposed, single-Halbach-array, form of the Inductrack, the L/D ratio is given by a simple relationship, given in Equation 1 below.

$$\cdot \frac{\text{Lift}}{\text{Drag}} = kv\left[\frac{L}{R}\right] \qquad (1)$$

Here $k=2\Pi/\lambda$, where $\lambda$(m.) is the wavelength of the Halbach array. Note that the Lift/Drag ratio increases linearly with the train velocity and that its slope is determined by the inductance (self plus mutual) and the resistance of the track circuits. For a ladder-like track, that is one composed of transverse bars terminated at both ends with shorting buses, typical values for L and R give Lift/Drag ratios of the order of 300 at speeds of 500 km/hr typical of high-speed maglev trains. This ratio is high enough to make the levitation losses small (less than 10 percent) of the aerodynamic losses at such speeds. Also, for the Inductrack the "transition speed," the speed at which the lift has risen to half its final value (and also the speed where the lift and drag forces are equal) is low, of order a few meters/second (walking speeds). Thus the first-proposed form of the Inductrack would seem well suited for high-speed maglev train applications.

However, an examination of the first-proposed form of the Inductrack for its possible use in an urban setting, where the typical speeds are of order one-tenth of that of a high-speed maglev system, shows that the older system leaves something to be desired. Now, unless inductive loading of the track circuits is employed, the Lift/Drag ratio will have dropped to 30 or less. For an urban train car weighing, say, 20,000 kilograms, a Lift/Drag ratio of 30 at 50 km/hr corresponds to a drag force of about 6500 Newtons at a drag power in excess of 90 kilowatts.

SUMMARY OF THE INVENTION

It is an object of the present invention to provide a simple permanent-magnet-excited maglev geometry that provides levitation forces and is stable against vertical displacements from equilibrium but is unstable against horizontal displacements.

It is another object to provide an Inductrack system used in conjunction with the permanent-magnet-excited maglev geometry to effect stabilization against horizontal displacements and to provide centering forces to overcome centrifugal forces when the vehicle is traversing curved sections of a track or when any other transient horizontal force is present.

Another object of the present invention is to employ Inductrack track elements as the stator of a linear induction-motor drive and braking system.

Still another object of the present invention is to provide an alternate design of a linear pole system that has improved levitating force capabilities and lessened lateral stabilizer force requirements.

Another object of the invention is to provide a track for use with a linear pole array, where the track has improved properties for shielding the moving levitator poles from the effects of weather and from debris that might be deposited on the track.

Another object of the invention is to provide the levitating action by using a Halbach array attached to the moving object where the array is attracted upward to an iron-plate guideway and to further provide stabilizing means using additional Halbach arrays comprised of an upper Halbach array and a lower Halbach array, with an Inductrack track located between them.

These and other objects will be apparent to those skilled in the art based on the disclosure herein.

One embodiment of the present invention is a simple permanent-magnet-excited maglev geometry that provides levitation forces and is stable against vertical displacements from equilibrium but is unstable against horizontal displacements. An Inductrack system is then used in conjunction with this system to effect stabilization against horizontal displacements and to provide centering forces to overcome centrifugal forces when the vehicle is traversing curved sections of the track or when any other transient horizontal force is present. In some proposed embodiments, the Inductrack track elements are also employed as the stator of a linear induction-motor drive and braking system.

This new configuration eliminates the need for centering wheels, except possibly when the car is at rest in the station or upon failure of the drive while in transit In such cases, below a low critical speed, the wheels would restrain the system from lateral motion beyond a limit set by a predetermined spacing of the wheels from their guide rails.

One embodiment of the new configuration includes linear pole assemblies with iron poles, excited by permanent-magnet material. These elements are mounted on the moving car. They interact magnetically with the pole faces of a linear track, also fabricated from magnetic material, such as iron or steel. As shown, the poles exert a levitation force when they are displaced downward from the matching (attracting) poles on the track. The sideways attractive force exerted by each pole is balanced, when in the centered position, by the attractive force from the mating pole. This system is unstable against transverse displacements from the centered position. In this embodiment, lateral stabilization is provided by Inductrack Halbach arrays and the associated track circuits. As long as the car is moving so that the various elements are in the centered state, no currents will be induced in the Inductrack track, so that losses will be minimal. Only when there is a deviation from the centered position will currents be induced. Thus the energy losses from the system should be substantially less than those of a conventional Inductrack system, where currents must flow to provide the necessary levitation forces. In addition, the car will always be magnetically levitated, whether at rest or in motion, something that is not the case in the conventional Inductrack system.

Damping of vertical oscillations is provided by covering the face of the track magnet poles with a thin aluminum sheet. The planar Inductrack circuits may also function as the stator of a linear induction motor system using powered electromagnets on the moving car.

An alternate design of the linear pole system is provided that has improved levitating force capabilities and lessened lateral stabilizer force requirements. The track portion of this linear pole array has improved properties for shielding the moving levitator poles from the effects of weather and from debris that might be deposited on the track.

In an alternate embodiment of the invention, the levitating action is provided by a Halbach array attached to the moving object The array is attracted upward to an iron-plate guideway. Stabilizing means are provided by additional Halbach arrays comprised of an upper Halbach array and a lower Halbach array, with an Inductrack track located between them.

DETAILED DESCRIPTION OF THE INVENTION

The present invention is an improved Inductrack configuration and represents a combination of the Inductrack principle of operation with another magnetic levitation configuration. The new combination represents an improvement in certain properties that is not achievable by either of the two configurations taken alone. The general Inductrack principle employed in some embodiments of this new idea is covered in U.S. Pat. No. 5,722,326, "Magnetic Levitation System for Moving Objects," R. F. Post, incorporated herein by reference.

Other embodiments of the present invention employ the Inductrack II magnet configuration described in a copending U.S. patent application Ser. No. 09/896,583, titled; "Improved Inductrack Magnet Configuration" filed on the same day as the present application and incorporated herein by reference. The magnet configuration of the above incorporated patent application Is referred to sometimes herein as "Inductrack II", wherein dual arrays are used, one on each side of track circuits.

The general concept involved in this new idea is as follows: A simple permanent-magnet-excited maglev geometry that is stable against vertical displacements from equilibrium but is unstable against horizontal displacements is employed to provide levitation forces. An Inductrack II system is then used in conjunction with this system to effect stabilization against horizontal displacements and to provide centering forces to overcome centrifugal forces when the vehicle is traversing curved sections of the track or when any other transient horizontal force is present In some proposed embodiments the Inductrack track elements are also employed as the stator of a linear induction-motor drive and braking system.

Horizontal stabilization has required the use of a system of wheels that run on the track and thereby supply the necessary centering forces. The use of such wheels limits the speed of the maglev system and introduces issues of frictional losses, and mechanical failure from wear with associated maintenance costs.

This new configuration eliminates the need for centering wheels, except possibly when the car is at rest in the station or upon failure of the drive while in transit. In such cases, below a low critical speed, the wheels would restrain the system from lateral motion beyond a limit set by a predetermined spacing of the wheels from their guide rails.

Figure 1:
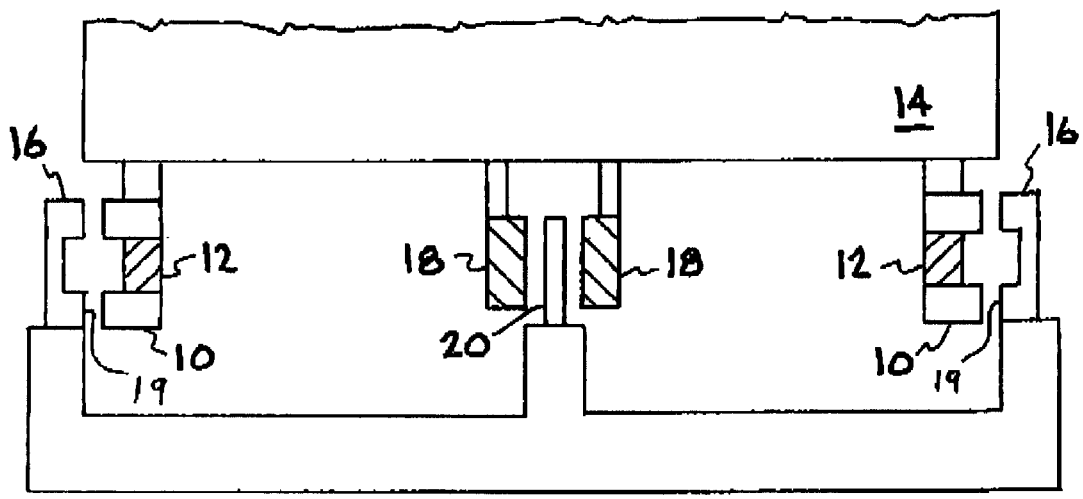
FIG. 1 shows a modified Inductrack configuration of the present invention.

One embodiment of the new configuration is shown schematically in FIG. 1. This embodiment includes linear pole assemblies 10 with iron poles, excited by permanent-magnet material 12. These elements are mounted on the moving car 14. They interact magnetically with the pole faces of a linear track 16, also fabricated from magnetic material, such as iron or steel. As shown the poles exert a levitation force when they are displaced downward from the mating (attracting) poles on the track. At the same time, the sideways attractive force exerted by each pole is balanced, when in the centered position, by the attractive force from the mating pole. However, as dictated by Earnshaw's theorem, this system is unstable against transverse displacements from the centered position. In this embodiment, lateral stabilization is provided by the Inductrack II Halbach arrays 18 and the associated track circuits 20. In the figure, a pair of Halbach arrays (mounted on the car) are shown, with a stationary vertical Inductrack II element located between them in the configuration as described in the copending patent application. As long as the car is moving so that the various elements are in the centered state, no currents will be induced in the track 20, so that losses will be minimal. Only when there is a deviation from the centered position will currents be induced. Thus the energy losses from the system should be substantially less than those of a conventional Inductrack system, where currents must flow to provide the necessary levitation forces. In addition, the car will always be magnetically levitated, whether at rest or in motion, something that is not the case in the conventional Inductrack system.

Damping of vertical oscillations could be provided by covering the face of the track 16 magnet poles with, e.g., a thin aluminum sheet 19. Other materials may be used as well, e.g., copper or thicker stainless steel. Eddy currents induced in this sheet by vertical displacements would provide the damping forces.

As noted above, the planar Inductrack circuits shown could also do dual service as the stator of a linear induction motor system using powered electromagnets on the moving car.

Thus, an embodiment of the present invention consists of a combination of a permanent-magnet-excited linear pole levitation system and a vertically oriented Inductrack II system, used here as a lateral stabilizer for the levitation system. An alternate improved design of the linear pole system is now provided, one with both improved levitating force capabilities and lessened lateral stabilizer force requirements. In addition, the stationary "track" portion of this linear pole array has improved properties for shielding the moving levitator poles from the effects of weather and from debris that might be deposited on the track. It also offers a simple means of switching from one track system to another with minimal displacement of the track elements.

Figure 2:
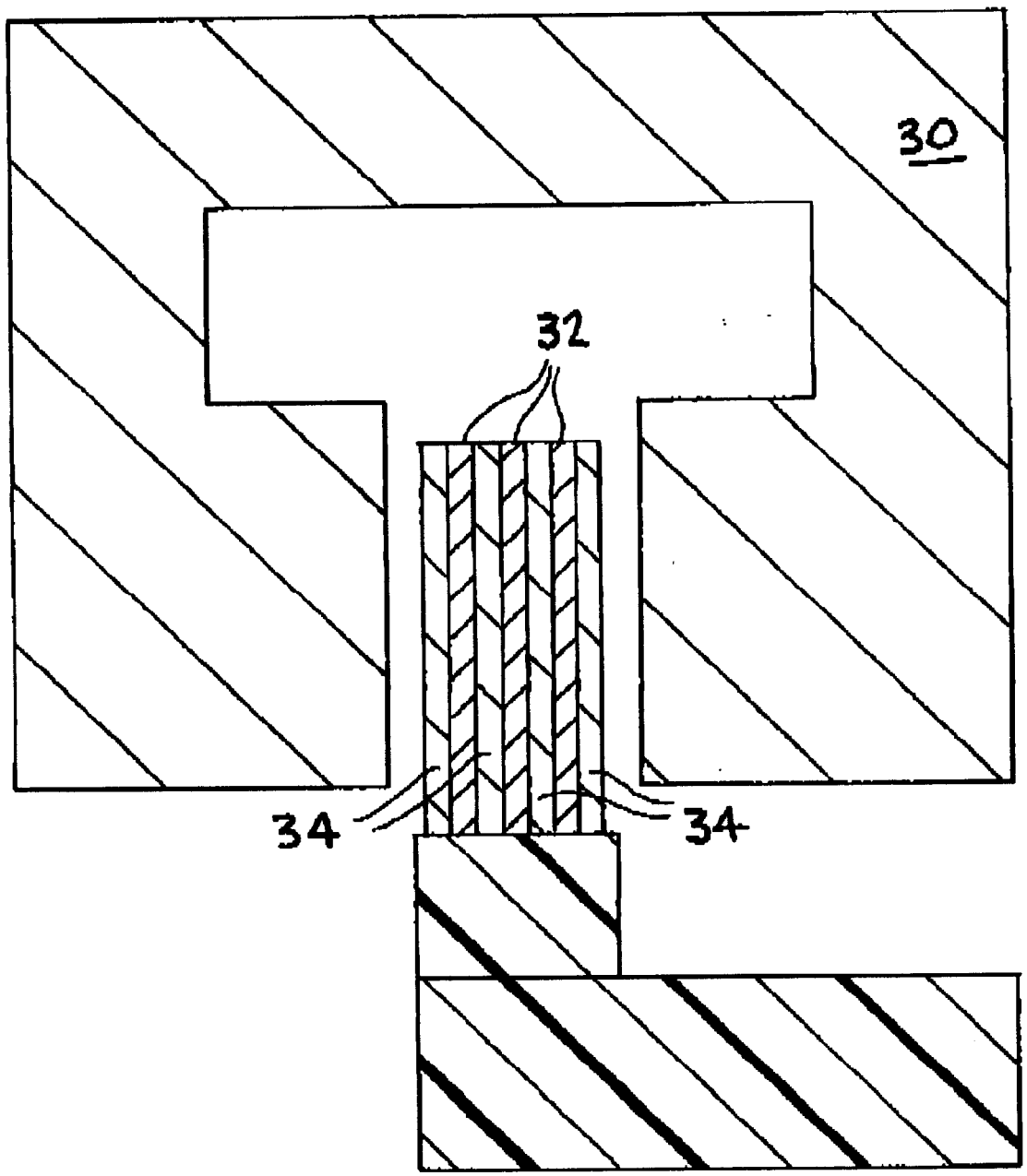
FIG. 2 shows an alternate Inductrack configuration of the present invention.

The improved linear-pole levitation magnetic geometry is shown schematically in FIG. 2. The "rail," to be fabricated of magnetically soft iron or steel, is "C-shaped," with its open gap on the lower side. Within this structure the levitating element, cantilevered from the moving car, is shown as an assembly (not to scale), consisting of permanent-magnet material 32 laminated with thin magnetically soft material 34. This magnetic configuration has the property of minimizing the leakage flux from the magnet pole so as to maximize the lifting force on that pole caused by the proximity of the stationary pole elements.

In this new structure, the levitating force exerted on the moving pole is increased due to the reduction in leakage flux that the new pole structure affords.

As can be seen, the new "rail" is configured so as to protect the moving pole assembly from snow and ice and from debris that might be deposited on the rail. Another desirable property of this levitating configuration is that the levitating force is, to lowest order, independent of lateral displacement of the levitated pole, since the decrease in levitating force of, say, the left-side pole, caused by lateral motion (from a centered position) to the right, is compensated by a corresponding increase in the levitating force from the right-side pole. Also, in the centered position the lateral forces from the left-side and right-side poles balance out, and the spatial derivative of the force is reduced.

Finally, the proposed "rail" pole structure should lend itself to switching of the moving car to another track through the simple expedient of moving down the end of an appropriately long section of the rail (supported fixedly at its other end) by a few inches, so as to mate with a lower rail that would lead to a siding or to another line. The associated Inductrack stabilizer "track" would need only to be made sufficiently high in the switched section of track to accommodate to this extra vertical motion.

Figure 3:
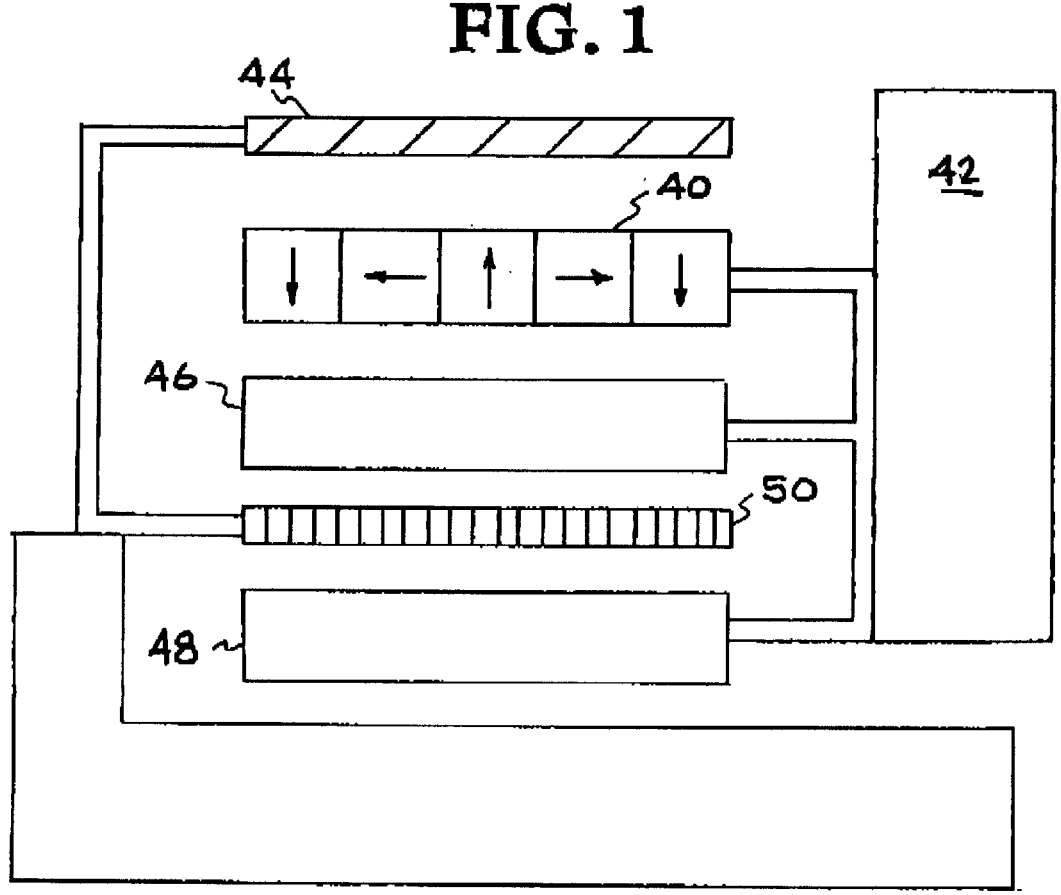
FIG. 3 shows a rail structure for an Inductrack system of the present invention.

FIG. 3 shows an alternate embodiment of the present invention. The levitating action is provided by Halbach array 40 attached to the moving object 42. Array 40 is attracted upward to an iron-plate guideway 44. Here the levitating Halbach arrays are oriented 90 degrees to the usual orientation used in the Inductrack, i.e., the direction of their periodicity is transverse to the direction of motion. In this orientation the magnetic field will be constant (except at the sides and ends of the Halbach array bars) in the direction of motion of the car, thus reducing the parasitic eddy currents induced in the iron guideway. Note that the congruence of the edges of the Halbach array and the iron guideway will provide strong centering forces for transverse displacements. Orienting the Halbach arrays 90 degrees to the usual orientation has the advantage of reducing eddy currents but the Halbach arrays could operate equally effectively in other orientations such as in the same direction as the Inductrack Halbach arrays.

Since the levitating configuration is unstable against vertical displacements (as dictated by Earnshaw's theorem), stabilizing means are provided by the additional Halbach arrays, shown in the figure. These are of the form described in the incorporated copending patent application, comprised of an upper Halbach array 46 and a lower Halbach array 48, with a "flat-track" Inductrack track 50 located between them. However, by design, the main levitating force is provided by the former set of Halbach arrays, so that the second set is called only to provide stabilization, i.e., to provide an up or down force as needed to keep the system at the desired levitation separation.

It would be a simple matter to incorporate an adjustment means on the levitating Halbach arrays so that they are "trimmed" to nearly the right force level to levitate a given load. This addition would further reduce the stabililzing force needed.

Note also that the Halbach stabilizer shown in FIG. 3 could be replaced by the combined stabilizer/drive-coil configuration described in the incorporated copending patent application. In this way the functions of levitation, stabilization, and powered-guideway drive could be combined in one compact assembly. As discussed above, the levitating action is provided by Halbach array 40 attached to the moving object 42. Array 40 is attracted upward to an iron-plate guideway 44.

The propulsion mechanism used in the present invention may be a linear induction motor. Such a motor generally comprises a coil structure or winding assembly carried by the vehicle and juxtaposed with a rail of ferromagnetic material mounted upon and fastened to the track so that a magnetic path is closed through this rail and, with appropriate energization of the winding assembly, develops a magnetic force component in the direction of vehicle propulsion.

The linear motors are, in effect, a linearly-unrolled version of the rotary motors. Among currently-known examples of the linear motors are a linear d.c. motor (monopolar or multipolar), linear synchronous motor, linear induction motor and linear pulse motor. Thrust of the linear motors, corresponding to torque of the rotary motors, generally depends on the structure of the motors. Other propulsion mechanisms are usable in the present invention and will be apparent to those skilled in the art based on the disclosure herein.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. A magnetic levitation system comprising:
   a vehicle body;
   a permanent-magnet-excited geometry operatively attached to said vehicle body for providing levitation forces upon said vehicle body, wherein said geometry is stable against displacements from equilibrium in a first plane but is unstable against displacements in a second plane; and
   an inductive track system for providing stabilization against displacements in said second plane, wherein said inductive track system comprises:
      a first Halbach array having a first magnetic field and a second Halbach array having a second magnetic field, wherein said first Halbach array and said second Halbach array are magnetically connected together and structurally connected to said vehicle body to form a first pair of Halbach arrays, wherein said first Halbach array comprises magnet configurations positioned with respect to said second Halbach array and said second Halbach array comprises magnet configurations positioned with respect to said first Halbach array such that a first magnetic flux component of said first magnetic field and a first magnetic flux component of said second magnetic field substantially cancel at a first plane between said first Halbach array and said second Halbach array, and a second magnetic flux component of said first magnetic field and a second magnetic flux component of said second magnetic field substantially add at said first Diane;
      a track of windings fixedly attached to a stationary support, wherein said track of windings is located between said first pair of Halbach arrays; and
      a propulsion mechanism for moving said first pair of Halbach arrays along said track, wherein when said first pair of Halbach arrays move along said track and said first plane is not located at said track, a current is induced in said windings and a restoring force is exerted on said first pair of Halbach arrays.

2. The magnetic levitation system of claim 1, wherein said first plane is substantially a vertical plane, wherein said second plane is substantially a horizontal plane.

3. The magnetic levitation system of claim 1, wherein said inductive track system is configured to overcome centrifugal forces when said vehicle body encounters a transient horizontal force.

4. The magnetic levitation system of claim 1, wherein said inductive track system is configured as the stator of a linear induction-motor drive and braking system.

5. The magnetic levitation system of claim 1, wherein said permanent-magnet-excited geometry comprises first pole assemblies with iron poles excited by permanent-magnet material, wherein said first pole assemblies are attached to said vehicle body.

6. The magnetic levitation system of claim 5, wherein said permanent-magnet-excited geometry further comprises second pole assemblies attached to a said stationary support, wherein said second pole assemblies comprise permanent magnet material, wherein said first pole assemblies and said second pole assemblies are configured to magnetically attract each other.

7. The magnetic levitation system of claim 6, further comprising means for damping vertical oscillations in said second pole assemblies.

8. The magnetic levitation system of claim 7, wherein said means for damping vertical oscillations comprises a sheet of material covering said second pole assemblies, wherein said sheet of material is selected from the group consisting of a thin aluminum sheet copper, and stainless steel.

9. The magnetic levitation system of claim 1, further comprising at least one electromagnet attached to said vehicle body, wherein said track of windings is configured to operate as a linear induction motor assembly.

10. A magnetic levitation system, comprising:
    a vehicle body;
    a permanent-magnet-excited geometry operatively attached to said vehicle body for providing levitation forces upon said vehicle body, wherein said geometry is stable against substantially vertical displacements from equilibrium but is unstable against substantially horizontal displacements; and
    an inductive track system attached to said vehicle body, wherein said inductive track system provides stabilization against said substantially horizontal displacements and provides centering forces, wherein said inductive track system comprises:
       a pair of Halbach arrays comprising a first Halbach array and a second Halbach array, wherein said pair of Halbach arrays are fixedly attached to said vehicle body;
       a track of windings fixedly attached to a stationary support, wherein said first Halbach array is located on a first side of said tack and wherein said second Halbach array is located on a second side of said track opposite from said first side, such that when said pair of Halbach arrays are under propulsion and they deviate from a magnetic cancellation plane located between said pair of Halbach arrays, currents are generated within said track of windings that induce a restoring force on said pair of Halbach arrays.

11. A method for operating a magnetic levitation system comprising;

providing a vehicle body;

providing a permanent-magnet-excited geometry operatively attached to said vehicle body, wherein said geometry is stable against displacements from equilibrium in a first plane but is unstable against displacements in a second plane;

providing levitation forces upon said vehicle body using said permanent-magnet-excited geometry: and providing stabilization against displacements in said second plane and providing centering forces, wherein the step of providing stabilization is carried out with an inductive track system attached to said vehicle body, wherein said inductive track system comprises:

a first Halbach array having a first magnetic field and a second Halbach array having a second magnetic field, wherein said first Halbach array and said second Halbach array are magnetically connected together and structurally connected to said vehicle body to form a first pair of Halbach arrays, wherein said first Halbach array comprises magnet configurations positioned with respect to said second Halbach array and said second Halbach array comprises magnet configurations positioned with respect to said first Halbach ray such that a first magnetic flux component of said first magnetic field and a first magnetic flux component of said second magnetic field substantially cancel at a first plane between said first Halbach array and said second Halbach array, and a second magnetic flux component of said first magnetic field and a second magnetic flux component of said second magnetic field substantially add at said first plane;

a track of windings fixedly attached to a stationary support, wherein said track of windings is located between said first pair of Halbach arrays; and a propulsion mechanism for moving said first pair of Halbach arrays along said track, wherein when said first pair of Halbach arrays move along said track and said first plane is not located at said track, a current is induced in said windings and a restoring force is exerted on said first pair of Halbach arrays.

12. The method claim 11, wherein said first plane is substantially a vertical plane, wherein said second plane is substantially a horizontal plane.

13. The method of claim 11, wherein said inductive track system is configured to substantially overcome centrifugal forces when said vehicle body encounters a transient horizontal force.

14. The method claim 11, wherein said inductive track system is configured as the stator of a linear induction-motor drive and braking system.

15. The method of claim 11, wherein said permanent-magnet-excited geometry comprises first pole assemblies with iron poles excited by permanent-magnet material, wherein said first pole assemblies are attached to said vehicle body.

* * * * *